US007078454B2

(12) United States Patent
Burleigh et al.

(10) Patent No.: US 7,078,454 B2
(45) Date of Patent: Jul. 18, 2006

(54) REPELLENT FLUOROCHEMICAL COMPOSITIONS

(75) Inventors: Malcolm B. Burleigh, Saint Paul, MN (US); David P. Cheatham, Woodbury, MN (US); John C. Clark, White Bear Lake, MN (US); A. Dale Otteson, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 374 days.

(21) Appl. No.: 10/124,523

(22) Filed: Apr. 17, 2002

(65) Prior Publication Data

US 2003/0204015 A1 Oct. 30, 2003

(51) Int. Cl.
C08J 3/00 (2006.01)
C08K 3/20 (2006.01)
C08L 75/00 (2006.01)
B05D 3/02 (2006.01)
B32B 27/00 (2006.01)

(52) U.S. Cl. ................ 524/507; 427/372.2; 427/385.5; 428/423.1; 524/590; 524/591; 524/839; 524/840; 525/123; 525/455

(58) Field of Classification Search ................ 524/507, 524/591, 839, 840, 590; 525/123, 455; 427/372.2, 385.5; 428/423.11
See application file for complete search history.

(56) References Cited

U.S. PATENT DOCUMENTS

| | | |
|---|---|---|
| 2,592,069 A | 4/1952 | Reid |
| 2,642,416 A | 6/1953 | Ahlbrecht et al. |
| 2,803,615 A | 8/1957 | Ahlbrecht et al. |
| 2,826,564 A | 3/1958 | Bovey et al. |
| 2,995,542 A | 8/1961 | Brown |
| 3,078,245 A | 2/1963 | Heine |
| 3,081,274 A | 3/1963 | Heine |
| 3,102,103 A | 8/1963 | Ahlbrecht et al. |
| 3,282,905 A | 11/1966 | Fasick et al. |
| 3,291,843 A | 12/1966 | Fritz et al. |
| 3,304,278 A | 2/1967 | Hauptschein et al. |
| 3,325,163 A | 6/1967 | Off et al. |
| 3,398,182 A | 8/1968 | Guenthner et al. |
| 3,574,791 A | 4/1971 | Sherman et al. |
| 3,787,351 A | 1/1974 | Olson |
| 3,896,251 A | 7/1975 | Landucci |
| 3,916,053 A | 10/1975 | Sherman et al. |
| 4,007,151 A * | 2/1977 | Ogawa et al. ............... 524/875 |
| 4,024,178 A | 5/1977 | Landucci |
| 4,043,964 A | 8/1977 | Sherman et al. |
| 4,264,484 A | 4/1981 | Patel |
| 4,401,780 A | 8/1983 | Steel |
| 4,504,401 A | 3/1985 | Matsuo et al. |
| 4,540,497 A | 9/1985 | Chang et al. |
| 4,565,641 A | 1/1986 | Chang et al. |
| 4,606,737 A | 8/1986 | Stern |
| 4,795,793 A | 1/1989 | Amimoto et al. |
| 4,937,123 A | 6/1990 | Chang et al. |
| 5,001,004 A | 3/1991 | Fitzgerald et al. |
| 5,025,052 A | 6/1991 | Crater et al. |
| 5,074,883 A | 12/1991 | Wang |
| 5,098,774 A | 3/1992 | Chang |
| 5,212,272 A | 5/1993 | Sargent et al. |
| 5,316,850 A | 5/1994 | Sargent et al. |
| 5,350,795 A | 9/1994 | Smith et al. |
| 5,410,073 A | 4/1995 | Kirchner |
| 5,411,766 A | 5/1995 | Kirchner |
| 5,414,111 A | 5/1995 | Kirchner |
| 5,460,887 A | 10/1995 | Pechhold |
| 5,688,884 A | 11/1997 | Baker et al. |
| 5,714,082 A | 2/1998 | Boardman et al. |

FOREIGN PATENT DOCUMENTS

WO WO 02/16517 A2 2/2002

OTHER PUBLICATIONS

Hayek, "Waterproofing and Water/Oil Repellency", 24 Kirk-Othmer Encyclopedia of Chemical Technology, (1979), pp. 442-465, 3rd Edition.

"Organofluorine Chemicals and their Industrial Applications", edited by R.E. Banks, Ellis Horwood Ltd., (1979), p. 55-59.

(Continued)

Primary Examiner—Patrick D. Niland
(74) Attorney, Agent, or Firm—Kent S. Kokko

(57) ABSTRACT

This invention provides compositions for treating fibrous substrates to render those substrates durably repellent to water and oil and durably resistant to dry soil comprising a 1) fluorochemical urethane formed by reacting a tri- or higher order isocyanate with a fluorochemical monofunctional compound and optionally a non-fluorinated aliphatic monofunctional compound; and 2) a fluorochemical polymeric surfactant.

The present invention also provides a method of treating fibrous substrates to render those substrates durably repellent to water and oil and durably resistant to dry soil comprising application of the aforementioned composition to a fibrous substrate with optionally one or more stain-blocker compounds such as acrylic and methacrylic acid polymers and copolymers, sulfonated phenol-formaldehyde resins, and styrene-maleic anhydride polymers and copolymers, said application of the composition taking place either coincident with or following application of the hydrophilic anti-staining compound or compounds to the substrate. Fibrous substrates treated according to this method and fibrous substrates treated with the aforementioned compositions are also disclosed.

27 Claims, No Drawings

OTHER PUBLICATIONS

Hendricks, "Industrial Fluorochemicals", Industrial Engineering Chemistry, (1953), pp. 99-105, vol. 45.

Bernett et al., "Wetting of Low-Energy Solids by Aqueous Solutions of Highly Fluorinated Acids and Salts", Journal of Physical Chemistry, (1959), p. 1911-1916, vol. 63.

Brace, "Long Chain Alkanoic and Alkenoic Acids with Perfluoroalkyl Terminal Segments", J. Org. Chem., (1962), pp. 4491-4498, vol. 27.

"Preparation, Properties, and Industrial Applications of Organofluorine Compounds", edited by R.E. Banks, Ellis Horwood Ltd., (1982), p. 26.

Kohler et al., "An Apparatus for Determining Both the Quantity of Gas Evolved and the Amount of Reagent Consumed in Reactions With Methyl Magnesium Iodide", J. Am. Chem. Soc., (1927), pp. 3181-3188, vol. 49.

U.S. Appl. No. 09/698,987, filed Oct. 27, 2000, "Fluorochemical Sulfonamide Surfactants".

* cited by examiner

REPELLENT FLUOROCHEMICAL COMPOSITIONS

FIELD OF THE INVENTION

This invention relates to the treatment of fibrous materials, particularly carpets, with fluorochemical compositions to impart durable water and oil repellency and dry soil resistance thereto.

BACKGROUND OF THE INVENTION

The treatment of various fibrous substrates, notably carpets, textiles, leathers and papers, with fluoroaliphatic group-containing polymers and oligomers enabling them to retain their original aesthetic appeal (e.g., to render them repellent to water- and oil-based stains and resistant to soils) has been known in the art for many years. Mason Hayek, Waterproofing and Water/Oil Repellency, in 24 KIRK-OTHMER ENCYCLOPEDIA OF CHEMICAL TECHNOLOGY 448–65 (3d ed. 1979), for example, provides a general overview of anti-staining and anti-soiling technology for fibrous substrates.

Fluorochemicals known to be useful for treating carpets include ester oligomers, as disclosed in U.S. Pat. No. 4,264,484 (Patel), carbodiimide oligomers, as disclosed in U.S. Pat. No. 3,896,251 (Landucci), guanidine oligomers, as disclosed in U.S. Pat. No. 4,540,497 (Chang), allophanate oligomers, as disclosed in U.S. Pat. No. 4,606,737 (Stem), oxazolidinone oligomers, as disclosed in U.S. Pat. No. 5,025,052 (Crater et al.), and acrylic polymers, as disclosed in U.S. Pat. No. 3,916,053 (Sherman et al.).

Fluorochemical urethane, urea, and biuret oligomers have often become the treatment of choice for carpets due to their durable soil-resistance properties. For example, U.S. Pat. No. 3,398,182 (Guenthner et al.) discloses the use of fluoroaliphatic urethanes in making oleophobic and hydrophobic coatings that resist removal by abrasion.

U.S. Pat. No. 5,350,795 (Smith et al.) discloses substantially organic solvent-free, aqueous solutions or dispersions for treating textile fibers and fabrics to impart oil and water repellency without thermal treatment comprising (a) a fluorochemical acrylate copolymer comprising the reaction product of a fluorinated acrylate monomer, polyoxyalkylene glycol acrylate or methacrylate, and polyoxyalkylene glycol diacrylate or dimethacrylate, and (b) a polyalkoxylated polyurethane having pendant perfluoroalkyl groups comprised of an aliphatic or aromatic tri- or higher order isocyanate, a fluorinated alcohol, amine or mercaptan, and a poly(oxyalkylene) diol or dithiol, the polyurethane having a weight average molecular weight of over 40,000.

U.S. Pat. No. 5,410,073 (Kirchner), U.S. Pat. No. 5,411,766 (Kirchner) and U.S. Pat. No. 5,414,111 (Kirchner) each describes polyfluoro nitrogen containing organic compounds made by reacting (a) at least one polyisocyanate or mixture of polyisocyanates that contain at least three isocyanate groups per molecule with (b) at least one fluorochemical compound which contains per molecule (i) a single functional group having one or more Zerewitinoff hydrogen atoms and (ii) at least two carbon atoms each of which contains at least two fluorine atoms, the amount of fluorochemical compound being sufficient to react with 95% to 40% of the isocyanate groups, (c) then reacting the reaction product of (a) and (b) with water in an amount to react with the about 5% to about 50% of remaining isocyanate groups; such compounds when applied to fibers and fabrics reportedly provide durable water-, oil- and soil-repellent and/or soil release properties to the fibrous substrate. U.S. Pat. No. 5,414,111 teaches specifically the use of a monofunctional, non-fluorinated organic compound as an optional reactive component.

U.S. Pat. No. 4,504,401 (Matsuo et al.) describes a stainproofing agent represented by the general formula $(R_f\text{-}X\text{-}A\text{-}CONH)_a W(NHCO\text{-}A'\text{-}Z)_{3-a}$, wherein $R_f$ is a polyfluoroalkyl group having from 1 to 20 carbon atoms, X is —R—, —CON(R$^1$)-Q- or —SO$_2$N(R$^1$)-Q- (where R is a divalent alkylene group, R$^1$ is a hydrogen atom or lower alkyl group and Q is a divalent organic group), each or A and A' is —O—, —S—, or —N(Z')- (where Z' is a hydrogen atom or a monovalent organic group), Z is a monovalent organic group, W is a trivalent organic group and a is an integer of 1, 2 or 3.

SUMMARY OF THE INVENTION

The inventors recognized the need for shelf-stable chemical compositions, including those containing fluorine that can successfully impart long-term durability, uniform oil- and water-repellency and soil-resistance and stain-resistance. These chemical compositions should be water and organic solvent soluble or dispersible and preferably not require high temperatures for curing.

Briefly, in one aspect, this invention provides compositions for treating fibrous substrates to render those substrates durably repellent to water and oil and durably resistant to dry soil comprising 1) a fluorochemical urethane formed by: (a) reacting a tri- or higher order polyisocyanate with a reactive fluorochemical monofunctional compound (preferably a $C_3$–$C_6$ fluorochemical monofunctional compound), in sufficient amounts to react with at least 50%, preferably at least 75%, of the available isocyanate groups and 2) a fluoroalkyl (meth)acrylate/polyoxyalkylene acrylate copolymer. Optionally, an aliphatic monofunctional compound may be present in amounts to react with up to 20% of the isocyanate groups present in the product compound. Optionally, any remaining isocyanate groups may be blocked isocyanate groups.

In another aspect, the present invention provides a method of treating fibrous substrates to render those substrates durably repellent to water and oil and durably resistant to dry soil comprising application of the aforementioned composition to a fibrous substrate and optionally one or more anti-staining compounds (also known as stainblockers) such as acrylic and methacrylic acid polymers and copolymers, sulfonated phenol-formaldehyde resins, and styrene-maleic anhydride polymers and copolymers, said application of the composition taking place either coincident with or preceding application of the fluorochemical treatment composition to the substrate.

In yet another aspect, the present invention provides fibrous substrates treated with these compositions imparting to those substrates appearance-retention properties such as durable dynamic and static repellency, stain release, and soil repellency.

Unless otherwise stated, the following terms used in the specification and claims have the meanings given below:

"Alkyl" means a saturated monovalent hydrocarbon radical having from one to about twelve carbon atoms, e.g., methyl, ethyl, 1-propyl, 2-propyl, pentyl, and the like.

"Alkylene" means a saturated divalent hydrocarbon radical having from one to about twelve carbon atoms, e.g., methylene, ethylene, propylene, 2-methylpropylene, pentylene, hexylene, and the like.

"Cured chemical composition" means that the chemical composition is dried or solvent has evaporated from the chemical composition at approximately ambient temperature (15–35° C.) or elevated temperature, until dryness, up to approximately 24 hours.

"Fibrous substrate" means materials comprised of synthetic fibers such as wovens, knits, nonwovens, carpets, and other textiles; and materials comprised of natural fibers such as cotton, paper, and leather.

"Fluorochemical monofunctional compound" means a compound having one reactive functional group, capable of reacting with an isocyanate group, and a fluoroalkyl or a fluoroheteralkyl group, e.g. $C_4F_9SO_2N(CH_3)CH_2CH_2OH$, $C_4F_9SO_2N(CH_3)CH_2CH_2NH_2$, $C_2F_5O(C_2F_4O)_3CF_2$ $SO_2N(H)C_2H_4SH$, and the like.

"Heteroalkyl" has essentially the meaning given above for alkyl or alkylene respectively except that one or more heteroatoms (i.e. oxygen, sulfur, and/or nitrogen) may be present in the alkyl chain, these heteroatoms being separated from each other by at least one carbon, e.g., $CH_3CH_2OCH_2CH_2$—, $CH_3CH_2OCH_2CH_2OCH(CH_3)CH_2$—, $C_4F_9CH_2CH_2SCH_2CH_2$—, —$CH_2OCH_2CH_2$—, and the like.

"Halo" means fluoro, chloro, bromo, or iodo, preferably fluoro and chloro.

"Long-chain monofunctional compound" means a compound having one isocyanate-reactive functional group and a long chain hydrocarbon group having 12 to 72 carbons which may be saturated, unsaturated, or aromatic, and may optionally be substituted with one or more chlorine, bromine, trifluoromethyl, or phenyl groups, e.g. $CH_3(CH_2)_{10}CH_2OH$, $CH_3(CH_2)_{14}CH_2NH_2$, and the like.

"Oxyalkylene" means a saturated divalent hydrocarbon radical having from one to about twelve carbon atoms and a terminal oxygen atom, e.g., methyleneoxy, ethyleneoxy, propyleneoxy, 2-methylpropyleneoxy, pentyleneoxy, hexyleneoxy, and the like.

"Perfluoroalkyl" has essentially the meaning given above for "alkyl" except that all or essentially all of the hydrogen atoms of the alkyl radical are replaced by fluorine atoms and the number of carbon atoms is from 3 to about 6, e.g. perfluoropropyl, perfluorobutyl, perfluorohexyl, and the like.

"Perfluoroheteroalkyl" has essentially the meaning given above for "perfluoroalkyl" except one or more non-adjacent —$CF_2$— groups are replaced by an in-chain oxygen, sulfur or nitrogen.

"Perfluorinated group" means an organic group wherein all or essentially all of the carbon bonded hydrogen atoms are replaced with fluorine atoms, e.g. perfluoroalkyl, perfluoroheteroalkyl, and the like.

"Polyfunctional isocyanate compound" means a compound containing three or more isocyanate (—NCO), or blocked isocyanate radicals, attached to a multivalent aliphatic or cycloaliphatic organic group, e.g. hexamethylene diisocyanate, the biuret and isocyanurate of hexamethylene diisocyanate, and the like.

DETAILED DESCRIPTION OF THE INVENTION

The fluorochemical treatments of the present invention comprise 1) fluorochemical, urethane compounds formed from the reaction of (a) a tri- or higher order isocyanate; (b) a stoichiometric amount of a reactive fluorochemical monofunctional compound sufficient to react with at least 50% of the isocyanate (i.e., —NCO) groups; and (c) and optionally a stoichiometric amount of aliphatic monofunctional compound sufficient to react with a portion of the remaining isocyanate groups and 2) a fluoroalkyl (meth)acrylate/polyoxyalkylene acrylate copolymer.

These above-described reactants provide a mixture of fluorochemical urethane compounds that are soluble in an organic solvent or readily emulsifiable in water, that may provide a thermally stable aqueous emulsion, and that is suitable for application onto a substrate by a variety of methods.

The fluorochemical treatments of the invention find particular utility when applied onto a substrate that is also treated with one or more hydrophilic anti-staining compounds (sometimes generically referred to as "stainblockers") such as acrylic and methacrylic acid polymers and copolymers, sulfonated phenolformaldehyde resins, and styrene-maleic anhydride polymers and copolymers. Substrates, particularly carpets that are so treated exhibit superior resistance to soiling and superior repellency to water and oil-borne stains.

Typically, the treatment compositions in accordance with this invention are emulsions, dispersions or solutions of from about 20 to about 99.5 weight percent of the above-described fluorochemical urethane compounds, 0.5 to about 80 weight percent of said fluorochemical polymeric surfactants. If present in the composition, the stainblocker may comprise up to six times the combined weight of fluorochemical urethane and fluorochemical polymeric surfactant. Economic factors will compel the choice of aqueous emulsions in most circumstances, though other suitable solvents may also be used to create the emulsion with similar utility. The treatment composition may be further diluted as desired.

The treatment compositions are typically applied to the carpet at levels from 0.05 to 10 weight percent solids, preferably 0.1 to 3 weight percent solids, based on the weight of the fiber or fabric (known as solids-on-fiber or S.O.F). Nonionic, anionic, cationic or amphoteric surfactants may also be used as dispersants for the composition for the application.

The fluorochemical urethane compounds of the invention may be formed by reacting (a) the tri- or higher order isocyanate with a reactive fluorochemical monofunctional compound, and (b) optionally with a limited amount of a aliphatic monofunctional compound. The reaction may be carried out in accordance with well-known techniques such as, for example, by condensation in a suitable solvent such as methyl isobutyl ketone (MIBK) using a small amount of a dibutyltin dilaurate catalyst. The urethane compound, formed in such a manner, may be emulsified in water or dissolved in an organic solvent and may optionally be combined with one or more suitable surfactants may be used to stabilize the emulsion.

Any aliphatic isocyanates having at least three isocyanate functionalities may be used in the preparation of the fluorochemical polymer. Among this class of useful compounds are aliphatic triisocyanate-functional biurets of the formula:

wherein x is an integer greater than or equal to 1, preferably 1 to 3, most preferably 1 and $R_h$ is a divalent noncyclic, linear or branched alkylene group and may be, for example, hexamethylene, ethylene, or butylene. Also useful are isocyanurate trimers of the formula:

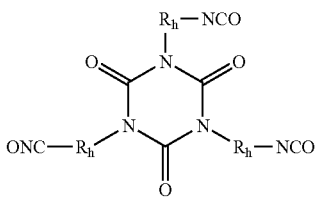

wherein $R_h$ is as previously described.

Representative examples of suitable polyfunctional isocyanate compounds include isocyanate functional derivatives of the polyfunctional isocyanate compounds as defined herein. Examples of derivatives include, but are not limited to, those selected from the group consisting of ureas, biurets, allophanates, dimers and trimers (such as uretdiones and isocyanurates) of isocyanate compounds, and mixtures thereof. Any suitable organic polyisocyanate, such as an aliphatic, alicyclic, araliphatic, or aromatic polyisocyanate, may be used either singly or in mixtures of two or more. The aliphatic polyfunctional isocyanate compounds generally provide better light stability than the aromatic compounds.

Examples of useful cycloaliphatic polyfunctional isocyanate compounds include, but are not limited to, those selected from the group consisting of dicyclohexylmethane diisocyanate ($H_{12}$MDI, commercially available as Desmodur™W, available from Bayer Corporation, Pittsburgh, Pa.), 4,4'-isopropyl-bis(cyclohexylisocyanate), isophorone diisocyanate (IPDI), cyclobutane-1,3-diisocyanate, cyclohexane 1,3-diisocyanate, cyclohexane 1,4-diisocyanate (CHDI), 1,4-cyclohexanebis(methylene isocyanate) (BDI), 1,3-bis(isocyanatomethyl)cyclohexane ($H_6$XDI), 3-isocyanatomethyl-3,5,5-trimethylcyclohexyl isocyanate, and mixtures thereof.

Examples of useful aliphatic polyfunctional isocyanate compounds include, but are not limited to, those selected from the group consisting of 1,4-tetramethylene diisocyanate, hexamethylene 1,4-diisocyanate, hexamethylene 1,6-diisocyanate (HDI), 1,12-dodecane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimer diisocyanate, the urea of hexamethylene diisocyanate, the biuret of hexamethylene 1,6-diisocyanate (HDI) (available as Desmodur™ N-100 and N-3200 from Bayer Corporation, Pittsburgh, Pa.), the isocyanurate of HDI (available as Demodur™ N-3300 and Desmodur™ N-3600 from Bayer Corporation, Pittsburgh, Pa.), a blend of the isocyanurate of HDI and the uretdione of HDI (available as Desmodur™ N-3400 available from Bayer Corporation, Pittsburgh, Pa.), and mixtures thereof.

Suitable commercially available polyfunctional isocyanates are exemplified by Desmodur™ N-3200, Desmodur™ N-3300, Desmodur™ N-3400, Desmodur™ N-3600, Desmodur™ H (HDI), and Desmodur™ N-100, each available from Bayer Corporation, Pittsburgh, Pa.

Other useful triisocyanates are those obtained by reacting three moles of a diisocyanate with one mole of a triol. For example, toluene diisocyanate, 3-isocyanatomethyl-3,4,4-trimethylcyclohexyl isocyanate, or m-tetramethylxylene diisocyanate can be reacted with 1,1,1-tris(hydroxymethyl)propane to form triisocyanates. The product from the reaction with m-tetramethylxylene diisocyanate is commercially available as CYTHANE 3160 (American Cyanamid, Stamford, Conn.).

Because of their widespread commercial availability, polyisocyanate-functional biurets and isocyanurates derived from the homopolymerization of hexamethylene diisocyanate are preferred for use in accordance with this invention. Such compounds are sold, for example, under the Desmodur tradename, whose products are available from Miles Corp.

Isocyanate group that remain after reaction with the fluorochemical monofunctional compound(s) and the aliphatic monofunctional compound(s) may optionally be blocked isocyanate groups. By the term "blocked isocyanate" is meant a (poly)isocyanate of which the isocyanate groups have been reacted with a blocking agent. Isocyanate blocking agents are compounds that upon reaction with an isocyanate group yield a group that is unreactive at room temperature with compounds that at room temperature normally react with an isocyanate but which group at elevated temperature reacts with isocyanate reactive compounds. Generally, at elevated temperature the blocking group will be released from the blocked (poly)isocyanate compound thereby generating the isocyanate group again which can then react with an isocyanate reactive group. Blocking agents and their mechanisms have been described in detail in "Blocked isocyanates III.: Part. A, Mechanisms and chemistry" by Douglas Wicks and Zeno W. Wicks Jr., Progress in Organic Coatings, 36 (1999), pp. 14–172.

The blocked isocyanate is generally a blocked di- or triisocyanate or a mixture thereof and can be obtained by reacting an isocyanate with a blocking agent that has at least one functional group capable of reacting with an isocyanate group. Preferred blocked isocyanates are blocked polyisocyanates that at a temperature of less than 150° C. are capable of reacting with an isocyanate reactive group, preferably through deblocking of the blocking agent at elevated temperature. Preferred blocking agents include arylalcohols such as phenols, lactams such as ε-caprolactam, δ-valerolactam, γ-butyrolactam, oximes such as formaldoxime, acetaldoxime, methyl ethyl ketone oxime, cyclohexanone oxime, acetophenone oxime, benzophenone oxime, 2-butanone oxime or diethyl glyoxime. Further suitable blocking agents include bisulfite and triazoles.

Representative fluorochemical monofunctional compounds useful in forming the fluorochemical urethane compositions may be depicted by the formula:

$$R_fQ'Z$$

wherein:

$R_f$ represents a perfluoroalkyl or perfluoroheteroalkyl group having from 3 to about 12 carbon atoms, preferably 3 to 8 carbon atoms, more preferably having from about 3 to about 5 carbon atoms; $R_f$ can contain straight chain, branched chain, or cyclic fluorinated alkylene groups or combinations thereof with straight chain, branched chain or cyclic alkylene groups; $R_f$ is preferably free of polymerizable olefinic unsaturation and can optionally contain catenary heteroatoms such as oxygen, divalent or hexavalent sulfur, or nitrogen; a fully fluorinated radical is preferred, but hydrogen or chlorine atoms may be present as substituents provided that not more than one atom of either is present for every two carbon atoms; the terminal portion of the $R_f$ group is fully fluorinated, preferably containing at least 7 fluorine atoms, e.g., $CF_3CF_2CF_2$—, $(CF_3)_2CF$—, —$CF_2SF_5$ or the like. Preferably, $R_f$ contains from about 40% to about 80% fluorine by weight, more preferably from about 50% to about 78% fluorine by weight; perfluorinated aliphatic groups (i.e., perfluoroalkyl groups of the formula $C_nF_{2n+1}$—) are the most preferred embodiments of $R_f$;

Q' is an organic linking group; and

Z is a functional group capable of reacting with the isocyanate groups f the polyisocyanate. Useful Z groups include, but are not limited to —$NH_2$, —SH, —OH, —NCO, $NR^1H$, where $R^1$ is as previously defined.

The fluoroaliphatic group, $R_f$, is linked to the Z group by a linking group designated Q'. Linking group Q' can be a covalent bond, a heteroatom, e.g., O or S, or an organic moiety. The linking group Q' is preferably an organic moiety containing 1 to about 20 carbon atoms, and optionally containing oxygen, nitrogen-, or sulfur-containing groups or a combination thereof, and preferably free of functional groups, e.g., polymerizable olefinic double bonds, thiols, easily abstracted hydrogen atoms such as cumyl hydrogens, and other such functionality known to those skilled in the art, that substantially interfere with free-radical oligomerization. Examples of structures suitable for linking group Q' include straight chain, branched chain, or cyclic alkylene, arylene, aralkylene, oxy, oxo, thio, sulfonyl, sulfinyl, imino, sulfonamido, carboxamido, carbonyloxy, urethanylene, ureylene, and combinations thereof such as sulfonamidoalkylene.

Preferred linking groups Q' can be selected according to ease of preparation and commercial availability. Below is a partial representative list of suitable organic Q' groups. For the purposes of this list, each k is independently an integer from 0 to about 20, $R_1$' is hydrogen, phenyl, or alkyl of 1 to about 4 carbon atoms, and $R_2$' is alkyl of 1 to about 20 carbon atoms. Each structure is non-directional, i.e. —$(CH_2)_k$ C(O)O— is equivalent to —O(O)C$(CH_2)_k$—.

| | |
|---|---|
| —$SO_2NR_1'(CH_2)_kO(O)C$— | —$CONR_1'(CH_2)_kO(O)C$— |
| —$(CH_2)_kO(O)C$— | —$CH_2CH(OR_2')CH_2O(O)C$— |
| —$(CH_2)_kC(O)O$— | —$(CH_2)_kSC(O)$— |
| —$(CH_2)_kO(CH_2)_kO(O)C$— | —$(CH_2)_kS(CH_2)_kO(O)C$— |
| —$(CH_2)_kSO_2(CH_2)_kO(O)C$— | —$(CH_2)_kS(CH_2)_kOC(O)$— |
| —$(CH_2)_kSO_2NR_1'(CH_2)_kO(O)C$— | —$(CH_2)_kSO_2$— |
| —$SO_2NR_1'(CH_2)_kO$— | —$SO_2NR_1'(CH_2)_k$— |
| —$(CH_2)_kO(CH_2)_kC(O)O$— | —$(CH_2)_kSO_2NR_1'(CH_2)_kC(O)O$— |
| —$(CH_2)_kSO_2(CH_2)_kC(O)O$— | —$CONR_1'(CH_2)_kC(O)O$— |
| —$(CH_2)_kS(CH_2)_kC(O)O$— | —$CH_2CH(OR_2')CH_2C(O)O$— |
| —$SO_2NR_1'(CH_2)_kC(O)O$— | —$(CH_2)_kO$— |
| —$(CH_2)_kNR_1'C(O)O$— | —$OC(O)NR'(CH_2)_k$— |

Preferably, Q' is —$SO_2N(R^1)R^2$—, where $R^1$ is a hydrogen or lower alkyl group, such as a $C_1$–$C_4$ alkyl group; and $R^2$ is an alkylene group or heteroalkylene group, preferably a $C_1$–$C_4$ alkylene group. Representative preferred fluorochemical monofunctional compounds include

| | |
|---|---|
| $CF_3(CF_2)_3SO_2N(CH_3)CH_2CH_2OH$, | $CF_3(CF_2)_3SO_2N(CH_3)CH(CH_3)CH_2OH$, |
| $CF_3(CF_2)_3SO_2N(CH_3)CH_2CH(CH_3)NH_2$, | $CF_3(CF_2)_3SO_2N(CH_2CH_3)CH_2CH_2SH$, |
| $CF_3(CF_2)_3SO_2N(CH_3)CH_2CH_2SCH_2CH_2OH$, | $C_6F_{13}SO_2N(CH_3)(CH_2)_4OH$, |
| $CF_3(CF_2)_5SO_2N(H)(CH_2)_3OH$, | $C_3F_7SO_2N(CH_3)CH_2CH_2OH$, |
| $CF_3(CF_2)_4SO_2N(CH_3)(CH_2)_4NH_2$, | $C_4F_9SO_2N(CH_3)(CH_2)_3OH$, |
| $CF_3(CF_2)_5SO_2N(CH_2CH_3)CH_2CH_2OH$, | $CF_3(CF_2)_5SO_2N(C_2H_5)(CH_2)_4OH$, |
| $CF_3(CF_2)_2SO_2N(C_2H)CH_2OCH_2CH_2CH_2OH$, | $CF_3(CF_2)_5SO_2N(C_2H_5)(CH_2)_4OH$, |

-continued

| | |
|---|---|
| $CF_3(CF_2)_2SO_2N(C_2H_5)(CH_2)_4OH$, | $CF_3(CF_2)_3SO_2N(C_3H_7)CH_2OCH_2CH_2CH_2OH$, |
| $CF_3(CF_2)_4SO_2N(CH_2CH_2CH_3)CH_2CH_2OH$, | $CF_3(CF_2)_4SO_2N(CH_2CH_2CH_3)CH_2CH_2NCH_3H$, |
| $CF_3(CF_2)_3SO_2N(C_4H_9)CH_2CH_2NH_2$, | $CF_3(CF_2)_3SO_2N(C_4H_9)(CH_2)_4SH$, |

Unexpectedly, it has been found that the fluorochemical urethane compounds of the present invention, having $C_3$–$C_6$ fluoroalkyl radicals, provide repellency and/or antisoiling properties comparable to those provided by higher fluoroalkyl radicals. Heretofore it has been believed that perfluorolkyl groups having at least 8 carbon atoms were necessary for adequate performance, and the performance of lower perfluoroalkl groups degraded with decreasing carbon number. Further, it has been found that only those fluorochemical monofunctional compounds having a —$SO_2N(R^1)$—$R^2$— linking group (as herein defined) maintained adequate performance with decreasing carbon chain, while the performance of those with other linking groups, e.g. —$C_nH_2$—, did degrade as expected.

Fluorochemical compositions have achieved widespread use in a variety of applications, including, for example, in oil- and/or water-repellent compositions, and in surfactant compositions. Some known fluorochemical compositions ultimately degrade to perfluorooctyl-containing compounds when exposed to biological, thermal, oxidative, hydrolytic and photolytic conditions found in the environment. It has been reported that certain perfluorooctyl-containing compounds ($C_8F_{17}$—) may tend to bio-accumulate in living organisms; this tendency has been cited as a potential concern regarding some fluorochemical compositions. For example, see U.S. Pat. No. 5,688,884 (Baker et al.). As a result, there is a desire for fluorine-containing compositions effective in providing desired functional properties, e.g., water- and oil-repellency, surfactant properties, etc. while eliminating more effectively from biological systems.

The performance of the present compositions are surprising in view of teachings that the lower perfluoroalkyl groups were significantly less effective than longer chain perfluoroalkyl groups, such as the perfluorooctyl group. For example, it has been demonstrated that surfactants derived from perfluorocarboxylic acids and perfluorosulfonic acids exhibit considerable differences in performance as a function of chain length. See, for example *Organofluorine Chemicals and their Industrial Applications*, edited by R. E. Banks, Ellis Horwood Ltd. (1979), p 56; J. O. Hendrichs, *Ind. Eng Chem.*, 45, 1953, p 103; M. K. Bernett and W. A. Zisman, *J. Phys. Chem.*, 63, 1959, p 1912.

Further, various models have been devised to explain the low surface energies and resultant high contact angle data of fluorinated polymer coatings that are based on a monolayer of a fluorinated carboxylic or sulfonic acids present at the air/liquid interface. The data suggest that only after the seven outermost carbon atoms of the fluoroalkyl group ($C_7F_{15}$—) were fully fluorinated did the contact angles (and therefore the surface energies) of various liquids on the surface approach those of a perfluorinated acid monolayer (see N. O. Brace, *J. Org. Chem.*, 27, 1962, p 4491 and W. A. Zisman, *Advan. Chem*, 1964, p. 22.). Therefore, one would expect that the performance of fluorinated coatings containing fluoroalkyl groups (e.g., coatings made by polymerizing fluoroalkyl (meth)acrylates) could be predicted from the known performance of perfluorocarboxylic and perfluorosulfonic acid derivatives, and the surface energy of the fluoropolymer coatings would be related to the chain length of the fluoroalkyl group of the fluoropolymer coating.

Surprisingly, it has been found that the compositions comprising the fluoroalkylsulfonamido moieties, having fluoroalkyl groups of three to six carbon atoms, exhibit surface energies and contact angle performance which are comparable to textile treatments comprising longer chain fluoroalkyl homologues, such as those having perfluorooctyl groups.

The present treatment compositions provide additional advantages. First, the precursor compounds containing the shorter fluoroalkyl groups useful in the treatment compositions of the invention may be produced at a lower cost per weight because of higher yields while maintaining their potency as effective low surface energy coatings at the same weight basis. For example, the heptafluorobutyryl fluoride precursor may be prepared in yields of 60% as compared to perfluoro-octanoyl fluoride precursor (31%) in an electrochemical fluorination process (*Preparation, Properties, and Industrial Applications of Organofluorine Compounds*, edited by R. E. Banks, Ellis Horwood Ltd (1982), p 26). Furthermore, the short chain carboxylic acids (the presumed intermediate degradation products) are less toxic and less bioaccumulative than the longer chain homologues.

The aliphatic monofunctional compounds that optionally may be combined with the fluorochemical monofunctional compounds in the formation of the fluorochemical urethane compositions of the invention may be used to reduce the overall cost of the treatment composition without suffering an attendant reduction in the performance obtained by the fluorochemical properties of the treatments. If employed, the aliphatic monofunctional compound may be added in amounts sufficient to react with any remaining isocyanate groups. Generally the aliphatic monofunctional compound is not added in amounts greater than 33%, preferably less than 20% of the available isocyanate groups. Useful aliphatic monofunctional compound include straight chain, branched chain, or cyclic aliphatic monofunctional compound containing from 1 to 72 carbon atoms. Such aliphatic monofunctional compounds are preferably free of polymerizable olefinic unsaturation and optionally can contain catenary heteroatoms such as oxygen, divalent or hexavalent sulfur, or nitrogen.

Useful non-fluorinated monofunctional compounds include those of the formula R'''-Z, wherein R''' is an aliphatic alkyl or heteroalkyl group and Z is an isocyanate-reactive functional group. Useful Z groups include, but are not limited to —$NH_2$, —SH, —OH, —NCO, $NR^1H$, where $R^1$ is a hydrogen or lower alkyl group, such as a $C_1$–$C_4$ alkyl group.

Other preferred embodiments of the chemical composition of the present invention include those compositions derived from long-chain aliphatic monofunctional compounds having 12 to 72 carbons. Long-chain hydrocarbon groups typically have been known to impart poor oil repellency; however, the chemical compositions of the present invention comprising terminal long-chain hydrocarbon groups having 12 to 72 carbons impart good stain-release properties. Long-chain aliphatic monofunctional compounds suitable for use in the chemical compositions of the present invention comprise at least one, essentially unbranched, aliphatic alcohols having from 12 to about 72 carbon atoms which may be saturated, unsaturated, or aromatic. These long-chain hydrocarbon monoalcohols can be optionally substituted, for example, with groups such as one or more chlorine, bromine, trifluoromethyl, or phenyl groups. Representative long-chain hydrocarbon monoalcohols include 1-octanol, 1-decanol, 1-dodecanol, 1-tetradecanol, 1-hexadecanol, 1-octadecanol, and the like, and mixtures thereof. Preferred long-chain hydrocarbon monoalcohols have 12 to 50 carbon atoms, with 12 to 50 carbon atoms being more preferred and 18–40 carbon atoms being most preferred for water solubility and performance.

Also useful in the present invention as textile treatments are blends of the fluorochemical treatments with fluorine-free extender compounds. These extender compounds, which are only optional components of the system, may be added to reduce the overall expense of the treatment without limiting the performance obtained by the fluorochemical characteristic of the applied treatment. Among the fluorine-free compounds useful as treatment extenders are siloxanes, acrylate and substituted acrylate polymers and copolymers, N-methylolacrylamide-containing acrylate polymers, urethanes, blocked isocyanate-containing polymers and oligomers, condensates or precondensates of urea or melamine with formaldehyde, glyoxal resins, condensates of fatty acids with melamine or urea derivatives, condensation of fatty acids with polyamides and their epichlorohydrin adducts, waxes, polyethylene, chlorinated polyethylene, alkyl ketene dimers, esters, and amides. Blends of these fluorine-free extender compounds are also considered useful. The relative amount of the extender compounds in the treatment is not critical to the present invention. The overall composition of the fluorochemical treatment should contain, however, relative to the mount of solids present in the overall system, at least 3 weight percent, preferably at least about 5 weight percent, carbon-bound fluorine.

The urethane compounds can be made according to the following step-wise synthesis. As one skilled in the art would understand, the order of the steps is non-limiting and can be modified so as to produce a desired chemical composition. In the synthesis, the polyfunctional isocyanate compound and the fluorochemical monofunctional compound(s) are dissolved together under dry conditions, preferably in a solvent, and then heating the resulting solution at approximately 40 to 80° C., preferably approximately 60 to 70° C., with mixing in the presence of a catalyst for one-half to two hours, preferably one hour. Depending on reaction conditions (e.g., reaction temperature and/or polyfunctional isocyanate used), a catalyst level of up to about 0.5 percent by weight of the polyfunctional isocyanate/fluorochemical monofunctional compound mixture may be used, but typically about 0.00005 to about 0.5 percent by weight is required, 0.02 to 0.1 percent by weight being preferred.

Suitable catalysts include, but are not limited to, tertiary amine and tin compounds. Examples of useful tin compounds include tin II and tin IV salts such as stannous octoate, dibutyltin dilaurate, dibutyltin diacetate, dibutyltin di-2-ethylhexanoate, and dibutyltinoxide. Examples of useful tertiary amine compounds include triethylamine, tributylamine, triethylenediamine, tripropylamine, bis(dimethylaminoethyl) ether, morpholine compounds such as ethyl morpholine, and 2,2'-dimorpholinodiethyl ether, 1,4-diazabicyclo[2.2.2]octane (DABCO, Aldrich Chemical Co., Milwaukee, Wis.), and 1,8-diazabicyclo[5.4.0.]undec-7-ene (DBU, Aldrich Chemical Co., Milwaukee, Wis.). Tin compounds are preferred.

The resulting isocyanate functional urethane compounds may then further reacted with one or more of the aliphatic monofunctional compounds described above. The monofunctional compounds are added to the above reaction mixture, and react(s) with up any remaining available —NCO groups. The above temperatures, dry conditions, and mixing are continued one-half to two hours, preferably one hour. Terminal fluorine-containing and optionally non-fluorinated aliphatic groups are thereby bonded to the urethane compounds.

Each fluorochemical urethane compound comprises a urethane group that is derived or derivable from the reaction of at least one polyfunctional isocyanate compound and at least one fluorochemical monofunctional compound. The fluorochemical urethane compound is terminated with (i) one or more perfluoroalkyl groups, or one or more perfluoroheteroalkyl groups; and (ii) optionally one or more non-fluorinated aliphatic groups. It will be understood that the reaction product will provide a mixture of compounds, some percentage of which will comprise compounds as described, but may further comprise urethane compounds having different substitution patterns and degree of substitution. Thus the compositions may include compounds of the formula:

wherein $R_f^*$ is $R_f$-Q'-Z', Z' is the residue of Z, A is the residue of said aliphatic isocyanate, having valency m, R''' is an aliphatic radical derived from the aliphatic monofunctional compound, and n (average) is at least 1.5, preferably at least 2.

The fluorochemical acrylate polymers useful in the present invention comprise polymerized fluorochemical acrylate monomer units of the formula:

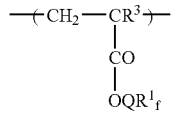

Preferably, the polymeric surfactants comprise interpolymerized units of fluorochemical monomer units and poly(oxyalkylene) acrylate monomer units have randomly arranged repeating units of the formula:

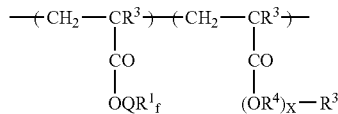

wherein $R^1_f$ a fluoroalkyl group having 3 to about 12 carbon atoms, preferably 3 to 8 carbon atoms, more preferably having from about 3 to about 5 carbon atoms, $R^3$ is H or C1 to C4 alkyl group, $R^4$ is an alkylene group having 2 to 4 carbon atoms, Q is an organic linking group and x is an integer of at least 5, generally 10 to 75 and can be as high as 100. The copolymers may be prepared as described in WO 01/30873.

The above polymeric surfactants may further comprise interpolymerized monomer units of acrylic ester or acrylamides bearing a water-solubilizing group to improve the water solubility or dispersibility. The water-solubilizing polar group may be anionic, nonionic, cationic or amphoteric. Preferred anionic groups include, but are not limited to, sulfonates (e.g., —SO$_3$M), sulfates (e.g., —OSO$_3$M), and carboxylates (e.g., —C(=O)OM). M is hydrogen, a metal cation such as an alkali or alkaline earth metal cation (e.g., sodium, potassium, calcium or magnesium, and the like), or a nitrogen-based cation, such as, for example, ammonium or a tertiary amine (e.g. (HOCH$_2$CH$_2$)$_2$N$^\oplus$HCH$_3$). The sulfonate polar groups are employed as oligomers or polymers that include polyacrylates and polyacrylamides. A monomer which may be interpolymerized with the previously described monomers, to provide water-solubilizing polar groups, is a polyacrylamide sulfonate of the formula

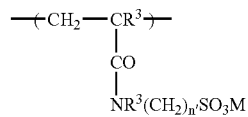

wherein $R^3$ is as defined above;
n' is an integer of 1 to 10, and
M is hydrogen, a metal cation, or a protonated amine.

A preferred anionic group is 2-acrylamido-2-methyl-1-propanesulfonic acid (AMPS) or the potassium salt thereof.

Representative useful cationic water-solubilizing groups include, for example, ammonium or quaternary ammonium salts. Preferred monomers that provide cationic water-solubilizing groups include dimethylaminoethyl methacrylate, dimethylaminoethyl acrylate, and the like.

The fluoroaliphatic group, designated herein as $R^1_f$ is a stable, inert, nonpolar, preferably saturated monovalent moiety which is both oleophobic and hydrophobic. The fluorinated polymer preferably comprises from 3 to about 25 $R^1_f$ groups and preferably comprises about 5 percent to about 30 percent, and more preferably about 8 percent to about 20 percent fluorine by weight based on the total weight of the oligomer, the loci of the fluorine being essentially in the $R^1_f$ groups. $R^1_f$ preferably contains at least about 3 to about 12 carbon atoms, preferably 3 to 8 carbon atoms, more preferably having from about 3 to about 5 carbon atoms. $R^1_f$ can contain straight chain, branched chain, or cyclic fluorinated alkyl groups or combinations thereof or combinations thereof with straight chain, branched chain, or cyclic alkyl groups. $R^1_f$ is preferably free of polymerizable olefinic unsaturation and can optionally contain catenary heteroatoms such as oxygen, divalent or hexavalent sulfur, or nitrogen. It is preferred that each $R^1_f$ contain about 40% to about 78% fluorine by weight, more preferably about 50% to about 78% fluorine by weight. The terminal portion of the $R^1_f$ group contains a fully fluorinated terminal group. This terminal group preferably contains at least 7 fluorine atoms, e.g., CF$_3$CF$_2$CF$_2$—, (CF$_3$)$_2$CF—, —CF$_2$SF$_5$, or the like. Perfluorinated aliphatic groups, i.e., those of the formula $C_nF_{2n+1}$, are the most preferred embodiments of $R^1_f$.

The fluoroaliphatic group, $R^1_f$, is linked to the ester group by a linking group designated Q. Linking group Q can be a covalent bond, a heteroatom, e.g., O or S, or an organic moiety. The linking group Q is preferably an organic moiety containing 1 to about 20 carbon atoms, and optionally containing oxygen, nitrogen-, or sulfur-containing groups or a combination thereof, and preferably free of functional groups, e.g., polymerizable olefinic double bonds, thiols, easily abstracted hydrogen atoms such as cumyl hydrogens, and other such functionality known to those skilled in the art, that substantially interfere with free-radical oligomerization. Examples of structures suitable for linking group Q include straight chain, branched chain, or cyclic alkylene, arylene, aralkylene, oxy, oxo, thio, sulfonyl, sulfinyl, imino, sulfonamido, carboxamido, carbonyloxy, urethanylene, ureylene, and combinations thereof such as sulfonamidoalkylene. Preferred linking groups Q can be selected according to ease of preparation and commercial availability. Below is a partial representative list of suitable organic Q groups. For the purposes of this list, each k is independently an integer from 0 to about 20, $R_1'$ is hydrogen, phenyl, or alkyl of 1 to about 4 carbon atoms, and $R_2'$ is alkyl of 1 to about 20 carbon atoms. Each structure is non-directional, i.e. —$(CH_2)_kC(O)O$— is equivalent to —$O(O)C(CH_2)_k$—.

| | |
|---|---|
| —$SO_2NR_1'(CH_2)_kO(O)C$— | —$CONR_1'(CH_2)_kO(O)C$— |
| —$(CH_2)_kO(O)C$— | —$CH_2CH(OR_2')CH_2O(O)C$— |
| —$(CH_2)_kC(O)O$— | —$(CH_2)_kSC(O)$— |
| —$(CH_2)_kO(CH_2)_kO(O)C$— | —$(CH_2)_kS(CH_2)_kO(O)C$— |
| —$(CH_2)_kSO_2(CH_2)_kO(O)C$— | —$(CH_2)_kS(CH_2)_kOC(O)$— |
| —$(CH_2)_kSO_2NR_1'(CH_2)_kO(O)C$— | —$(CH_2)_kSO_2$— |
| —$SO_2NR_1'(CH_2)_kO$— | —$SO_2NR_1'(CH_2)_k$— |
| —$(CH_2)_kO(CH_2)_kC(O)O$— | —$(CH_2)_kSO_2NR_1'(CH_2)_kC(O)O$— |
| —$(CH_2)_kSO_2(CH_2)_kC(O)O$— | —$CONR_1'(CH_2)_kC(O)O$— |
| —$(CH_2)_kS(CH_2)_kC(O)O$— | —$CH_2CH(OR_2')CH_2C(O)O$— |
| —$SO_2NR_1'(CH_2)_kC(O)O$— | —$(CH_2)_kO$— |
| —$(CH_2)_kNR_1'C(O)O$— | —$OC(O)NR'(CH_2)_k$— |

For linking $R^1_f$, Q is preferably alkylene or sulfonamido, or sulfonamidoalkylene.

In $(OR^4)_x$, $R^4$ is an alkylene group having 2 to 4 carbon atoms, such as —$CH_2CH_2$—, —$CH_2CH_2CH_2$—, —$CH(CH_3)CH_2$—, and —$CH(CH_3)CH(CH_3)$—, the oxyalkylene units in said poly(oxyalkylene) being the same, as in poly(oxypropylene), or present as a mixture, as in a straight or branched chain of randomly distributed oxyethylene and oxypropylene units or as in a straight or branched chain of blocks of oxyethylene units and blocks of oxypropylene units. The poly(oxyalkylene) chain can be interrupted by or include one or more catenary linkages, though it is preferred that such linkages be free of reactive functional groups containing active hydrogen atoms, providing such linkages do not substantially alter the solubility-imparting character of the poly(oxyalkylene) chain. [The term "active hydrogen atom" as used in this application means a hydrogen atom (other than an amido hydrogen atom) which is reactive with a Grignard reagent, as described in J. Am. Chem. Soc., 49, 3181 (1927).] Where said catenary linkages have three or more valences, they provide a means for obtaining a branched chain of oxyalkylene units. The poly(oxyalkylene) radicals in the oligomers can be the same or different, and they can be pendant. It is also preferred that the molecular weight of the poly(oxyalkylene) radical be between about 500 and 5000 or higher, e.g. 100,000 or more, more preferably 2000 to 4000, in order to obtain said desired solubility.

X is oxygen, sulfur or a linking group which is preferably an organic moiety containing 1 to about 20 carbon atoms, and optionally containing oxygen, nitrogen-, or sulfur-containing groups or a combination thereof, and preferably free of functional groups.

Particularly preferred of these are those containing one polyoxypropylene and having at least one other block of polyoxyethylene attached to the polyoxypropylene block. Additional blocks of polyoxyethylene or polyoxypropylene can be present in a molecule. These materials having an average molecular weight in the range of about 500 to about 15,000 are commonly available as PLURONIC™ manufactured by the BASF Corporation and available under a variety of other trademarks from other chemical suppliers. In addition, polymers called PLURONIC™ R (reverse Pluronic structure) are also useful in the invention.

Particularly useful polyoxypropylene polyoxyethylene block polymers are those comprising a center block of polyoxypropylene units and blocks of polyoxyethylene units to each side of the center block. These copolymers have the formula shown below:

$(EO)_n$-$(PO)_m$-$(EO)_n$ wherein m is an integer of about 21 to about 54 and n is an integer of about 7 to about 128. Additional useful block copolymers are block polymers having a center block of polyoxyethylene units and blocks of polyoxypropylene units to each side of the center block. The copolymers have the formula as shown below:

$(PO)_n$-$(EO)_m$-$(PO)_n$ wherein m is an integer of about 14 to about 164 and n is an integer of about 9 to about 22.

Another preferred polyalkyleneoxy moiety useful in the co-polymers of the present invention containing a nonafluorobutanesulfonamido segment are those derived from polyethylene glycols having a molecular weight of about 200–10,000. Suitable commercially available polyethylene glycols are available from Union Carbide under the trade name CARBOWAX™.

The acrylate copolymers can be prepared, for example, by free radical initiated copolymerization of a fluoroaliphatic radical-containing acrylate (fluoroalkyl acrylate) with a poly(oxyalkylene) monoacrylate or diacrylate or mixtures thereof. The molecular weight of the polyacrylate polymer can be controlled by adjusting the concentration and activity of the initiator, concentration of monomers, and temperature, and by chain-transfer agents, such as thiols, e.g. n-octyl mercaptan. Fluoroaliphatic acrylates, such as described in the above preparation, are known in the art (e.g., see U.S. Pat. Nos. 2,803,615, 2,642,416, 2,826,564, 3,102,103, 3,282,905, and 3,304,278). The poly(oxyalkylene) acrylates used in the above preparation, and other acrylates useful for such purposes, can be prepared from commercially available hydroxy and alkoxy poly(oxyalkylene) materials, such as those sold under the trademarks PLURONIC, CARBOWAX, NECKS, and TRITON, by reacting such hydroxy materials in a known manner with acrylic acid, methacrylic acid, acryloyl chloride, or acrylic anhydride.

Other fluoroaliphatic radical-containing terminally ethylenically unsaturated monomers suitable for the preparation of the polymers of this invention, for example by copolymerizing with corresponding poly(oxyalkylene)-containing, terminally ethylenically unsaturated comonomers, are known in the art (e.g., see U.S. Pat. Nos. 2,592,069, 2,995,542, 3,078,245, 3,081,274, 3,291,843, and 3,325,163, and the ethylenically unsaturated materials suitable for providing fluoroaliphatic radical-containing structural units disclosed in U.S. Pat. No. 3,574,791). The fluorochemical acrylate polymers may also optionally contain units derived from other monomers such as alkyl acrylates, vinylidene chloride, and n-methylol acrylamide.

The fluorochemical acrylate polymers useful in the present invention are disclosed, for example, in U.S. Pat. No. 3,787,351 (Olson), U.S. Pat. No. 4,795,793 (Amimoto et al.), U.S. Pat. No. 5,350,795 (Smith et al) and Applicant's copending application No. U.S. Ser. No. 09/698,987, filed Oct. 27, 2000 which are incorporated herein by reference.

Preferably, the fluorochemical acrylate polymer is present in an amount of about 0.5 to 80 weight percent, based on solids content. Preferably the fluorochemical urethane is present in an amount of about 20 to 99.5 weight percent, based on solids content. If present in the composition, the stainblocker may comprise up to six times the combined weight of fluorochemical urethane and fluorochemical polymeric surfactant. Generally, the treatment composition contains at least about 65% water.

The fluorochemical composition of the present invention may optionally be blended with one or more non-fluorinated additives. These non-fluorinated additives include any of the non-fluorinated compounds known in the art to provide an anti-soiling effect when applied to carpet with a suitable fluorochemical agent. Such compounds include, for example, hydrocarbon surfactants such as water soluble sulfonates of succinic esters, particularly sodium dioctylsulfosuccinate (DOSS), branched and linear alcoholic ethoxylates, alkylated alkynyl diols, polyethoxylated siloxanes, and alkyl, alkylether and alkylaryl sulfates, sulfonates and their corresponding acids. A particularly useful hydrocarbon surfactant is disodium hexadiphenyloxide disulfonate.

Non-fluorinated additives useful in this invention also include hydrophilic anti-staining compounds such as acrylic and methacrylic acid polymers and copolymers, sulfonated phenol-formaldehyde resins, and styrene-maleic anhydride polymers. Blends of these compounds are also considered useful. Additional non-fluorinated compounds suitable for use in the present invention include those sulfonated novolak resin compositions described by U.S. Pat. No. 5,098,774 (Chang), whose description is incorporated herein by reference and those compounds described by U.S. Pat. No. 5,316,850 (Sargent et al.) whose description is also incorporated herein by reference. If present in the composition, the stainblocker may comprise up to six times the combined weight of fluorochemical urethane and fluorochemical polymeric surfactant.

Commercially available non-fluorinated additives suitable for combination with the fluorochemical treatment composition of this invention include the following: Aerosol™ OT Surfactant available from Rohm & Haas Corp.; Surfynol™ Surfactant 440 available from Air Products, Inc.; Synthrapol™ KB Surfactant available from ICI Americas Corp.; Silwet™ Surfactant L-77 available from Union Carbide Corp.; Witco™ Surfactant 1298, available from Witco Corp.; and Siponate™ Surfactant DS-10, available from Rhone-Poulenc, Inc, and Dowfax 8390, available from Dow Chemical.

The fluorochemical treatments preferably are applied to a substrate along with one or more non-fluorinated compounds known in the art to impart anti-staining properties when applied to a substrate with a fluorochemical agent. These anti-staining compounds may constitute a pretreatment to application of the fluorochemical treatments of the invention, i.e., they can be applied prior to the application of the fluorochemical treatment, or alternatively may be applied coincident with the fluorochemical treatment, i.e., in the same processing step. These compounds, known in the art generally as "stainblockers," include hydrophilic anti-staining compounds such as acrylic and methacrylic acid polymers and copolymers, sulfonated phenolformaldehyde resins, alpha-olefin maleic anhydride copolymers, and styrene-maleic anhydride polymers and copolymers. Blends of such compounds are also considered useful.

Preferred stainblockers include polycarboxylate salts, such as ammonium salts of hydrolyzed styrene/maleic anhydride copolymers, as a component in soil resist treatments for unscoured carpets. The polycarboxylate salts are preferably used in combination with fluorochemical urethanes and fluorochemical polymeric surfactants to impart soil resistance, water repellency, and oil repellency to carpet fibers.

It has been discovered that these mixtures impart better repellency properties when applied at higher pHs (i.e., at pH within the range of about 5 to about 11 for the previously noted example).

Generally, polycarboxylate salts useful in the present invention include ammonium and alkali metal salts of those polycarboxylic acids which have a molecular weight of at least 400 grams per mole, preferably at least 1000 grams per mole, and have an equivalent weight, measured as grams of polymer per acid equivalent, of no greater than 300 grams per equivalent, preferably no greater than 150 grams per equivalent. The polycarboxylate salts should be non-tacky solids as measured at room temperature.

Useful polycarboxylic acids include acrylic acid-containing polymers; i.e., polyacrylic acid, copolymers of acrylic acid and one or more other monomers that are copolymerizable with acrylic acid, and blends of polyacrylic acid and one or more acrylic acid-containing copolymers. These can be produced using well-known techniques for polymerizing ethylenically unsaturated monomers. Preferably, the polycarboxylic acids are methacrylic acid-containing polymers, e.g., polymethacrylic acid, copolymers of methacrylic acid and one or more other monomers that are copolymerizable with methacrylic acid, and blends of polymethacrylic acid and one or more methacrylic acid copolymers.

The polycarboxylic acid polymers useful in the invention can also be prepared using methods well-known in the art for polymerization of ethylenically unsaturated monomers. Such monomers include monocarboxylic acids, polycarboxylic acids, and anhydrides of the mono- and polycarboxylic acids; substituted and unsubstituted esters and amides of carboxylic acids and anhydrides; nitriles; vinyl monomers; vinylidene monomers; monoolefinic and polyolefinic monomers; and heterocyclic monomers. Specific representative monomers include itaconic acid, citraconic acid, aconitic acid, maleic acid, maleic anhydride, fumaric acid, crotonic acid, cinnamic acid, oleic acid, palmitic acid, and substituted or unsubstituted alkyl and cycloalkyl esters of these acids, the alkyl or cycloalkyl groups having 1 to 18 carbon atoms such as methyl, ethyl, butyl, 2-ethylhexyl, octadecyl, 2-sulfoethyl, acetoxyethyl, cyanoethyl, hydroxyethyl, b-carboxyethyl and hydroxypropyl groups. Also included are amides of the foregoing acids, such as acrylamide, methacrylamide, methylolacrylamide, 1,1-dimethylsulfoethylacrylamide, acrylonitrile, and methacrylonitrile. Various substituted and unsubstituted aromatic and aliphatic vinyl monomers may also be used; for example, styrene, a-methylstyrene, p-hydroxystyrene, chlorostyrene, sulfostyrene, vinyl alcohol, N-vinyl pyrrolidone, vinyl acetate, vinyl chloride, vinyl ethers, vinyl sulfides, vinyl toluene, butadiene, isoprene, chloroprene, ethylene, isobutylene, and vinylidene chloride. Also useful are various sulfated natural oils such as sulfated castor oil, sulfated sperm oil, sulfated soybean oil, and sulfonated dehydrated castor oil. Particularly useful monomers include ethyl acrylate, butyl acrylate, itaconic acid, styrene, sodium sulfostyrene, and sulfated castor oil, either alone or in combination.

In the methacrylic acid-containing polymers, the methacrylic acid preferably provides about 30 to 100 weight percent, more preferably about 60 to 90 weight percent, of the polymer. The optimum proportion of methacrylic acid in the polymer depends on the comonomer(s) used, the molecular weight of the copolymer, and the pH at which the material is applied. When water-insoluble comonomers such as ethyl acrylate are copolymerized with methacrylic acid, they may comprise up to about 40 weight percent of the methacrylic acid-containing polymer. When water-soluble comonomers such as acrylic acid or sulfoethyl acrylate are copolymerized with methacrylic acid, the water soluble comonomers preferably comprise no more than 30 weight percent of the methacrylic acid-containing polymer and preferably the methacrylic acid-containing polymer also comprises up to about 50 weight percent water-insoluble monomer.

Commercially available acrylic polymers useful for making polycarboxylate salts of this invention include Carbopolä (available from B. F. Goodrich) and the Leukotan family of materials such as Leukotan 970, Leukotan 1027, Leukotan 1028, and Leukotan QR 1083, available from Rohm and Haas Company.

Useful methacrylic acid-containing polymers for making polycarboxylate salts of this invention are also described in U.S. Pat. No. 4,937,123 (Chang et al.), U.S. Pat. No. 5,074,883 (Wang), and U.S. Pat. No. 5,212,272 (Sargent et al.).

Useful polycarboxylic acids also include hydrolyzed polymers of maleic anhydride and at least one or more ethylenically unsaturated monomers. The unsaturated monomer may be an alpha-olefin monomer or an aromatic monomer, although the latter is preferred. A variety of linear and branched chain alpha-olefins may be used including alkyl vinyl ethers. Particularly useful alpha-olefins are 1-alkenes containing 4 to 12 carbon atoms, such as isobutylene, 1-butene, 1-hexene, 1-octene, 1-decene, and 1-dodecene, with isobutylene and 1-octene being preferred, and with 1-octene being most preferred. One particularly useful alkyl vinyl ether is methyl vinyl ether. A portion of the alpha-olefins can be replaced by one or more other monomers, e.g., up to 50 wt. % of alkyl (C1–4) acrylates, alkyl (C1–4) methacrylates, vinyl sulfides, N-vinyl pyrrolidone, acrylonitrile, acrylamide, as well as mixture of the same.

A variety of ethylenically unsaturated aromatic monomers may be used to prepare the hydrolyzed polymers. Specific examples of ethylenically unsaturated aromatic monomers include free radically polymerizable materials such as styrene, a-methylstyrene, 4-methyl styrene, stilbene, 4-acetoxystilbene (used to prepare a hydrolyzed polymer from maleic anhydride and 4-hydroxy-stilbene), eugenol, isocugenol, 4-allylphenol, safrole, mixtures of these materials, and the like. Styrene is most preferred. The utility of some of these materials may be improved by increasing the amount of polymerization initiator or acylating or etherifying the phenolic hydroxy groups.

In the hydrolyzed polymers, the ratio of units derived from ethylenically unsaturated monomer to units derived from maleic anhydride is about 0.4:1 to 1.3:1 when the unsaturated monomer is an alpha-olefin, and is about 1:1 to 2:1 when using an unsaturated aromatic monomer. In any event, a ratio of about 1:1 is most preferred.

Hydrolyzed polymers suitable for use in the invention may be prepared by hydrolyzing ethylenically unsaturated maleic anhydride polymers. Ammonia, amines, alkali metal hydroxides (such as sodium hydroxide, potassium hydroxide, and lithium hydroxide) are suitable hydrolyzing agents. Hydrolysis can be effected in the presence of more than or less than a molar amount of the alkali metal hydroxide. The hydrolyzed polycarboxylic acid copolymer may also be an acid ester, i.e., a portion of the carboxylic acid groups may be esterified with, for example, an alcohol such as ethanol, n-propanol or ethylene glycol monobutyl ether. The hydrolyzed polycarboxylic acid may also be amidated with, for example, n-butylamine, or aniline to make amic acid salt.

Commercially available maleic anhydride-containing copolymers useful for making polycarboxylate salts of this invention include styrene/maleic anhydride copolymers (e.g., the SMA series, available from Elf Atochem) and methyl vinyl ether/maleic anhydride copolymers (e.g., Gantrez™, available from ISP Corp.) Hydrolyzed polymers of at least one or more alpha-olefin monomers and maleic anhydride useful to make polycarboxylate salt-containing compositions of this invention are also described in U.S. Pat. No. 5,460,887 (Pechhold). Hydrolyzed polymers of at least one or more ethylenically unsaturated aromatic monomers and maleic anhydride useful in the compositions of this invention are also described in U.S. Pat. No. 5,001,004 (Fitzgerald et al.).

Additional non-fluorinated anti-staining compounds suitable for use in the invention include those sulfonated novolak resin compositions described by U.S. Pat. No. 5,098,774 (Chang) and U.S. Pat. No. 5,316,850 (Sargent et at.), both of whose descriptions are herein incorporated by reference. The anti-staining compositions typically are applied to the substrate at levels between 0.15 and 3 weight percent of the hydrophilic anti-staining compound or compounds based on the weight of the fiber. One particularly useful stainblocker is FX-657™ available from the 3M Company.

Fibrous substrates that can be treated in accordance with the invention are textile fibers (or filaments) and fabrics, including fabrics made into finished products, made from cotton, polyester, polyolefin, polyamide, acrylic, acetate or blends thereof, as well as finished garments, upholstered furniture, and installed carpet. The fibers or filaments as such or in aggregated form, e.g. yarn, tow, web or roving, or fabric such as woven or knit fabric can be treated with the composition of the invention.

The treatment compositions of the present invention may be dissolved in a variety of solvents to form treatment compositions suitable for use in the treatment of fibrous substrates. Suitable solvents include water, alcohols, esters, glycol ethers, amides, ketones, hydrocarbons, chlorohydrocarbons, chlorocarbons, and mixtures thereof. Depending upon the substrate to which the composition is being applied, water is the preferred solvent because it does not raise any environmental concerns and is accepted as safe and non-toxic. Preferably, the treatment composition comprises an aqueous emulsion of the fluorochemical urethane and the fluorochemical polymeric surfactant.

The complete composition suitable for treating a fibrous substrate may be prepared by combining the fluorochemical polymeric surfactants with an aqueous emulsion of the fluorochemical urethane compounds and optionally the stainblocker, non-fluorinated additives and any hydrocarbon surfactants. Forming the treatment emulsion may require using one or more surfactants, such a hydrocarbon surfactants, compatible with the particular chosen treatment. The water should be at least about 65 wt. % of the total treatment composition, preferably at least about 75 wt. %. The concentration of the fluorochemical treatment within the complete aqueous composition of this invention may be independently chosen to yield a desired concentration of treatment on the finished substrate given a choice of processing parameters, e.g., roller speed, drying capacity, as is known in the art.

The treatment composition containing the fluorochemical urethane compounds and the fluorochemical polymeric surfactant may be applied to a fibrous substrate using any state of the art application method. Typically, the composition will be applied by spraying directly and evenly onto the dry or prewet substrate, by immersing (e.g., padding) the substrate into the composition, or by foam application of the composition onto the substrate, or spray application. The treatment usually may be heat cured by drying the treated substrate in an oven held at between 200° F. and 300° F., although the treatment may also be left to cure onto the substrate under ambient conditions.

The aqueous treating solution may be applied to the carpet via spraying to about 15% by weight wet pickup, using a laboratory-sized spray booth with conveyor belt designed to mimic the performance of a large-scale commercial spray booth as is conventionally used in carpet mills. The wet sprayed carpet is then dried at 120° C. until dry (typically for 10–20 minutes) in a forced air oven. The application rate (in % SOF) is controlled by varying the conveyor belt speed. Alternatively the treatment composition may be applied by a foam applicator, as is know in the art, such as with Kusters KFA or Fluicon applicators.

The following examples are offered to aid in a better understanding of the present invention. These examples are not to be construed as an exhaustive compilation of all embodiments of the present invention and are not to be unnecessarily construed as limiting the scope thereof.

EXAMPLES

Glossary Table

| Abbreviation | Description | Availability |
|---|---|---|
| Autoacid A-80 | Polyurea sulfate | Peach State, Rome, GA |
| DURATECH ™ N-119 | Fluorochemical urethane | DuPont, Wilmington, DE |
| FCS-1 | MeFBSEA (22.8%)/ PLURONIC ™ Acrylate (77.2%) | Can be prepared as described in WO 01/30873 (Savu et al., Example 4) |
| FC-661 | Stain Blocker | 3M, St. Paul, MN |
| IGEPAL ™ CO-630 | Nonylphenyl polyethylene glycol | Chem Associates, North East, PA |
| MeFBSE | $C_4F_9SO_2N(CH_3)CH_2CH_2OH$ | Made by reacting perfluorobutane-sulfonyl fluoride with $CH_3NH_2$ and ethylene chlorohydrin, essentially as described in Ex. 1 of U.S. Pat. No. 2,803,656 (Ahlbrecht, et al.) |
| N3300 | DESMODUR ™ N 3300; Polyfunctional isocyanate resin based on hexamethylene diisocyanate | Bayer, Pittsburgh, PA |
| SA | Stearyl alcohol; $CH_3(CH_2)_{17}OH$ | Sigma-Aldrich, Milwaukee, WI |
| SB-1 | Stain Blocker | Can be prepared as described in U.S. Pat. No. 6,074,436 (Polymer I, column 9, line 66) |
| SILWET ™ L-77 | Polyoxyalkyleneoxide modified heptamethyltrisiloxane | Setre Chemical Co, Memphis, TN |
| SERMUL ™ EA-146 | Sodium nonylphenol polyethylene glycol ether sulfate | SASOL, Ltd., Johannesburg, South Africa |
| TWEEN ™ -81 | Ethoxylated sorbitan monooleate | Anatrace, Inc., Maumee, OH |
| WITCONATE ™ DS-10 | Sodium dodecylbenzene sulfonate | Witco SA, Paris, France |

Test Methods

Water Repellency Test

Treated carpet samples were evaluated for water repellency using this test method. Carpet samples to be evaluated were challenged to penetrations by blends of DI water and isopropyl alcohol (IPA). Each blend was assigned a rating number (dyne/cm) as shown in Table 1. In running the Water Repellency Test, treated carpet samples were placed on a flat, horizontal surface and the carpet pile was hand-brushed in the direction giving greatest lay to the yarn. Five small drops of water, or water/IPA mixtures were gently placed at points at least one inch (2.5 cm) apart on the carpet sample. If, after observing for ten seconds at a 45° angle, four of the five drops were visible as a sphere or hemisphere, the carpet was deemed to pass the test. The reported water repellency rating corresponds to the highest numbered water, or water/IPA mixture for which the treated sample passed the described test.

| Water Repellency Rating Number (dynes/cm) | Water/IPA Blend (% by volume) |
|---|---|
| 76 | Fails water |
| 72 | 100% water |
| 68 | 99/1 |
| 64 | 98/2 |
| 60 | 97/3 |
| 56 | 95/5 |
| 52 | 94/6 |
| 48 | 92/8 |
| 44 | 90/10 |
| 40 | 88/12 |
| 36 | 85/5 |
| 32 | 80/20 |

Oil Repellency Test

Carpet samples were evaluated for oil repellency using the following procedure. In this test, carpet samples were challenged to penetration by oil or oil mixtures of varying surface tensions. Oils and oil mixtures were given ratings described in Table 2. The oil repellency test was run in the same manner as the water repellency test listed above, with the exception that observation time was 30 seconds instead of ten seconds. The reported oil repellency corresponding to the highest oil or oil mixture for which the treated carpet sample passed the test.

| Oil Repellency Rating Number (dynes/cm) | Mineral oil/n-hexadecane Composition (% volume) |
|---|---|
| 34 | Fails mineral oil |
| 32.16 | 100/0 |

-continued

| Oil Repellency Rating Number (dynes/cm) | Mineral oil/n-hexadecane Composition (% volume) |
|---|---|
| 31.54 | 92/8 |
| 30.85 | 83/17 |
| 30.31 | 76/24 |
| 29.74 | 67/33 |
| 29.07 | 55/45 |
| 28.46 | 42/58 |
| 27.84 | 26/74 |
| 27.22 | 0/100 |

Carpet Samples

Nylon-6 and Nylon-6,6 carpet samples were obtained from Shaw Industries, Dalton Ga., and polypropylene carpet samples were obtained from Mohawk, Dalton, Ga.

Preparation of MeFBSE/N3300/SA Urethane; FCUR-1

A 500 mL round bottom flask equipped with a magnetic stirrer and fitted with a condenser was charged with MeFBSE (58.0 grams), methyl isobutyl ketone (100.0 grams), SA (6.0 grams) and N3300 (36.0 grams). Upon dissolution, the mixture was heated to reflux, DBTDL (0.02 grams) was added, and heating was continued for one hour. The solution was cooled, and yielded MeFBSE/N3300/SA Urethane; FCUR-1. A solution of WITCONATE™ DS-10 (5 grams) in DI water (400 grams) was slowly added to the solution in the 500 mL flask with vigorous stirring, keeping the temperature between 65° C. and 73° C. during addition. Upon completion of addition, the solution was sonicated with a Cole-Parmer ultrasonic homogenizer (model CPX 600, available from Cole-Parmer, Vernon Hills, Ill.) for five minutes. The solvent was removed using a rotary evaporator.

Application of Stain Blocker (Nylon Samples)

The carpet sample was placed carpet fiber side down, in a tray containing the treating composition. The treating composition contains sufficient stain-blocking material to give the desired percent solids on carpet (% SOC) and was prepared by dissolving or dispersing the material and optionally the desired amount of salt in DI water and adjusting the pH to a value of approximately 2 (unless otherwise specified) using 10% aqueous Autoacid A-80. The weight of the aqueous treating solution in the tray was approximately 3.5 to 4.0 times the weight of the carpet sample. The carpet sample was manipulated, by hand, to distribute the entire volume of treating solution to give a percent wet pick-up of 350–400%. The carpet was then steamed, rinsed, extracted and allowed to cool to near room temperature Spray Application The aqueous treating composition was applied by spraying onto the carpet fibers to achieve the specified levels. Nylon carpets were sprayed while damp from stain blocker application. Unscoured polypropylene carpet samples were sprayed while dry. The samples were then oven-dried at 250° F. (121° C.) for 25 minutes for Nylon carpet samples and 17 minutes for the polypropylene carpet samples.

Example 1

FCUR-1 was added to DI water at a level of 9.4 g/L. FCS-1 was then added to the ensuing dispersion at a level of 2.5 g/L. The dispersion was applied to stain-blocked carpet as described in Spray Application above.

Table 1 lists additives and additive levels for Examples 1–8 and Comparative Examples C1–C4. The results of the oil and water repellency tests for various carpet samples are listed.

TABLE 1

| Example | Additive (level g/L) | Nylon-6 OR | Nylon-6 WR | Polypropylene OR | Polypropylene WR | Nylon-6,6 OR | Nylon-6,6 WR |
|---|---|---|---|---|---|---|---|
| C1 | FCUR-1 (9.4) | 30.31 | 32 | 34 | 44 | 34.00 | 32 |
| C2 | FCUR-1 (9.4)/ FCS-661 (6.2) | 34.00 | 76 | 34 | 76 | 34 | 76 |
| 1 | FCUR-1 (9.4)/ FCS-1 (2.5) | 27.84 | 36 | 34 | 76 | 31.54 | 32 |
| 2 | FCUR-1 (9.4)/ IGEPAL ™ CO630 (1.25)/ FCS-1 (1.25) | 29.07 | 32 | 34 | 76 | 32.16 | 32 |
| 3 | FCUR-1 (9.4)/ SILWET ™ L-77 (1.25)/ FCS-1 (1.25) | 27.22 | 36 | 34 | 76 | 34.00 | 32 |
| 4 | FCUR-1 (9.4)/ SERMUL ™ EA-146 (1.25)/ FCS-1 (1.25) | 29.74 | 44 | 34 | 48 | 34 | 32 |
| C3 | DURATECH ™ N-119 (9.4) | 34 | 32 | | | | |
| 5 | DURATECH ™ N-119 (6.7)/ FCS-1 (2.7) | 32.16 | 32 | | | | |
| 6 | DURATECH ™ N-119 (5.4)/ FCS-1 (4.0) | 31.54 | 32 | | | | |
| 7 | DURATECH ™ N-119 (2.7)/ FCS-1 (6.7) (0.04/0.10) | 31.54 | 32 | | | | |
| 8 | SB-1 (8.0)/ FCUR-1 (9.4)/ FCS-1 (2.5) @ pH = 9 | 27.22 | 32 | 27.22 | 32 | | |

What is claimed is:

1. A fluorochemical treatment composition comprising
   1) a fluorochemical urethane consisting of the reaction product of:
      a. an aliphatic polyisocyanate having three or more isocyanate groups; and
      b. a fluorochemical monofunctional compound of the formula $R_f$-Q'-Z;
   wherein $R_f$ a perfluoroalkyl or perfluoroheteroalkyl group,
   Q' is an organic linking group, and
   Z is an isocyanate-reactive functional group, and
   said fluorochemical is in an amount sufficient to react with at least about 50% of the available isocyanate groups; and
      c. a non-fluorinated aliphatic monofunctional compound; and
   2) a fluoroalkyl (meth)acrylate/polyoxyalkylene (meth)acrylate copolymer.

2. The composition of claim 1 wherein said Z group is selected from —$NH_2$, —SH, —OH, —NCO, $NR^1H$, and said $R_f$ group has from 3 to 5 carbon atoms.

3. The composition of claim 1 wherein said fluorochemical monofunctional compound is selected from the group consisting of:

| | |
|---|---|
| CF$_3$(CF$_2$)$_3$SO$_2$N(CH$_3$)CH$_2$CH$_2$OH, | CF$_3$(CF$_2$)$_3$SO$_2$N(CH$_3$)CH(CH$_3$)CH$_2$OH, |
| CF$_3$(CF$_2$)$_3$SO$_2$N(CH$_3$)CH$_2$CH(CH$_3$)NH$_2$, | CF$_3$(CF$_2$)$_3$SO$_2$N(CH$_2$CH$_3$)CH$_2$CH$_2$SH, |
| CF$_3$(CF$_2$)$_3$SO$_2$N(CH$_3$)CH$_2$CH$_2$SCH$_2$CH$_2$OH, | C$_6$F$_{13}$SO$_2$N(CH$_3$)(CH$_2$)$_4$OH, |
| CF$_3$(CF$_2$)$_5$SO$_2$N(H)(CH$_2$)$_3$OH, | C$_3$F$_7$SO$_2$N(CH$_3$)CH$_2$CH$_2$OH, |
| CF$_3$(CF$_2$)$_4$SO$_2$N(CH$_3$)(CH$_2$)$_4$NH$_2$, | C$_4$F$_9$SO$_2$N(CH$_3$)(CH$_2$)$_3$OH, |
| CF$_3$(CF$_2$)$_5$SO$_2$N(CH$_2$CH$_3$)CH$_2$CH$_2$OH, | CF$_3$(CF$_2$)$_5$SO$_2$N(C$_2$H$_5$)(CH$_2$)$_4$OH, |
| CF$_3$(CF$_2$)$_5$SO$_2$N(C$_2$H$_5$)(CH$_2$)$_4$OH, | CF$_3$(CF$_2$)$_3$SO$_2$N(C$_3$H$_7$)CH$_2$OCH$_2$CH$_2$CH$_2$OH, |
| CF$_3$(CF$_2$)$_4$SO$_2$N(CH$_2$CH$_2$CH$_3$)CH$_2$CH$_2$OH, | CF$_3$(CF$_2$)$_4$SO$_2$N(CH$_2$CH$_2$CH$_3$)CH$_2$CH$_2$NCH$_3$H, |
| CF$_3$(CF$_2$)$_3$SO$_2$N(C$_4$H$_9$)CH$_2$CH$_2$NH$_2$, and | CF$_3$(CF$_2$)$_3$SO$_2$N(C$_4$H$_9$)(CH$_2$)$_4$SH. |

4. The composition of claim 1 wherein said non-fluorinated aliphatic monofunctional compound is of the formula R'''-Z, wherein R''' is an aliphatic group and Z is an isocyanate-reactive functional group.

5. The composition of claim 4 wherein said non-fluorinated aliphatic monofunctional compound comprises unbranched, aliphatic alcohols having from 12 to about 72 carbon atoms.

6. The composition of claim 4 comprising a fluorochemical urethane of the formula

$(R_f^*)_nA(NHCO-Z'R''')_{m-n}$ wherein $R_f^*$ is the residue of $R_f$-Q'-Z', Z' is the residue of Z of said aliphatic monofunctional compound R'''-Z, A is the residue of said aliphatic isocyanate, having valency m, R''' is an aliphatic group, and n (average) is at least 1.5.

7. The composition of claim 1 wherein $R_f$ a fluoroalkyl group having from 3 to about 5 carbon atoms, Q' is —SO$_2$N(R$^1$)R$^2$—

R$^1$ is a —H or —CH$_3$,

R$^2$ is an alkylene group having 1 to 3 carbon atoms, and

Z is —OH.

8. The composition of claim 1 wherein the amount of aliphatic monofunctional compound is in an amount sufficient to react with the remaining available isocyanate groups.

9. The composition of claim 1 wherein said aliphatic monofunctional compound is in an amount sufficient to react with 33% or less of the available isocyanate groups.

10. The composition of claim 1 wherein the amount of aliphatic monofunctional compound is in an amount sufficient to react with 15% or less of the available isocyanate groups.

11. The composition of claim 1 wherein the amount of fluorochemical monofunctional compound is in an amount sufficient to react with 75% or more of the available isocyanate groups.

12. The composition of claim 1 wherein $R_f$ is a perfluoroalkyl group.

13. The composition of claim 1 further comprising a hydrophilic anti-staining compound.

14. The composition of claim 1 wherein said fluoroalkyl (meth)acrylate/polyoxyalkylene (meth)acrylate copolymer comprises interpolymerized units of fluoroalkyl acrylate monomer units and poly(oxyalkylene) acrylate monomer units of the formula:

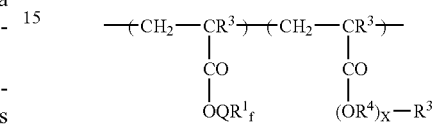

wherein $R^1_f$ a fluoroalkyl group, $R^3$ is H or a C1 to C4 alkyl group, $R^4$ is an alkylene group having 2 to 4 carbon atoms, Q is an organic linking group and x is an integer of at least 5.

15. The copolymer of claim 14 wherein said $R^1_f$ group has 3 to 5 carbon atoms.

16. The composition of claim 1 wherein said fluoroalkyl (meth)acrylate/polyoxyalkylene (meth)acrylate further comprising interpolymerized monomer units of acrylic ester or acrylamides bearing a water-solubilizing group.

17. The composition of claim 16 wherein said acrylamides bearing a water-solubilizing groups are of the formula

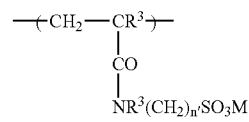

wherein $R^3$ is H or C1 to C4 alkyl group;

n' is an integer of 1 to 10, and

M is hydrogen, a metal cation, or a tertiary amine.

18. The treatment composition of claim 1 further comprising a solvent.

19. The treatment composition of claim 15 comprising at least 65 wt. % water.

20. The treatment composition of claim 1 comprising from about 20 to about 99.5 weight percent of said fluorochemical urethane compounds, and 0.5 to 80 weight percent of said fluoroalkyl (meth)acrylate/polyoxyalkylene (meth)acrylate copolymer.

21. The composition of claim 1, further comprising a hydrocarbon surfactant.

22. The treatment composition of claim 1, further comprising a polycarboxylic acid stainblocker and wherein the pH of said treatment composition is from 5 to 11.

23. A method for imparting stain-release characteristics to a fibrous substrate comprising the steps of:

(a) applying a treatment composition of claim 1, and (b) allowing the treatment composition to cure.

24. The method of claim 20 wherein said treatment composition is applied in an amount sufficient to provide between 0.05% and 3% solids on fiber.

25. An article comprising:
a fibrous substrate having a cured coating derived from at least one solvent and the treatment composition of claim 1.

26. The treatment composition of claim 1, wherein any isocyanate groups remaining after said reaction of said polyisocyanate with said fluorochemical monofunctional compound are blocked isocyanate groups.

27. The treatment composition of claim 1, wherein any isocyanate groups remaining after said reaction of said polyisocyanate with said fluorochemical monofunctional compound and said aliphatic monofunctional compound are blocked isocyanate groups.

* * * * *

UNITED STATES PATENT AND TRADEMARK OFFICE
CERTIFICATE OF CORRECTION

PATENT NO. : 7,078,454 B2  
APPLICATION NO. : 10/124523  
DATED : July 18, 2006  
INVENTOR(S) : Malcolm B. Burleigh et al.

Page 1 of 1

It is certified that error appears in the above-identified patent and that said Letters Patent is hereby corrected as shown below:

Col. 4

Line 62, delete " NH——CN " and insert -- NH·CN --, therefor. 

Col. 12

Line 1, delete "N⊖HCH₃)" and insert -- N⊕HCH₃) --, therefor.

Col. 13

Line 16, delete "SO₂NR₁'(CH₂)ₖ—" and insert -- SO₂NR₁'(CH₂)ₖ— --, therefor.

Col. 23  
Line 7, in Claim 3, delete "CF₃(CF₂)₅" and insert -- CF₃(CF₂)₂ --, therefor.  
Line 15, in Claim 4, delete "an" and insert -- a non-fluorinated --, therefor.  
Line 25, in Claim 6, after "R'")ₘ₋ₙ" insert -- , --.  
Line 32, in Claim 6, delete "an" and insert -- a non-fluorinated --, therefor.

Col. 24  
Line 25, in Claim 15, delete "copolymer" and insert -- composition --, therefor.  
Lines 28-29, in Claim 16, delete "comprising" and insert -- comprises --, therefor.

Signed and Sealed this

Nineteenth Day of February, 2008

JON W. DUDAS  
*Director of the United States Patent and Trademark Office*